United States Patent
Akasaki et al.

(10) Patent No.: US 6,441,102 B2
(45) Date of Patent: Aug. 27, 2002

(54) AMINO-GROUP-CONTAINING POLYMER (SALT) AND PRODUCTION PROCESS THEREFOR

(75) Inventors: Ichimoto Akasaki, Otsu; Masahito Takagi, Suita; Takuya Saeki, Suita; Koichiro Saeki, Suita, all of (JP)

(73) Assignee: Nippon Shokubai Co., Ltd. (JP)

( * ) Notice: Subject to any disclaimer, the term of this patent is extended or adjusted under 35 U.S.C. 154(b) by 0 days.

(21) Appl. No.: 09/779,261

(22) Filed: Feb. 8, 2001

(30) Foreign Application Priority Data

Feb. 10, 2000 (JP) ........................................ 2000-034193

(51) Int. Cl.⁷ .................... C08F 283/06; C08G 65/332; C08G 65/333; C08L 71/00
(52) U.S. Cl. .................... 525/404; 525/408; 525/118; 525/162; 525/523; 525/529; 525/530; 525/531; 528/423; 528/424
(58) Field of Search ................... 525/404, 408, 525/118, 162, 523, 529, 530, 531; 528/423, 424

(56) References Cited

U.S. PATENT DOCUMENTS

| | | | |
|---|---|---|---|
| 3,705,076 A | 12/1972 | Usala | |
| 3,719,629 A | 3/1973 | Martin et al. | |
| 4,126,596 A | 11/1978 | Schimmel et al. | |
| 5,952,432 A | 9/1999 | Yamaguchi et al. | |
| 2001/0018489 A1 | 8/2001 | Angel et al. | |

FOREIGN PATENT DOCUMENTS

| | | |
|---|---|---|
| EP | 0639592 A1 | 2/1995 |
| EP | 1 124 541 A0 | 4/2000 |
| EP | 1 125 954 A2 | 8/2001 |
| JP | 43-6235 B | 3/1968 |
| JP | 55-33746 B2 | 9/1980 |
| JP | 55-35422 B | 9/1980 |
| JP | 61-23615 A | 2/1986 |
| JP | 63-56549 A | 3/1988 |
| JP | 63-61321 B | 11/1988 |
| JP | 7-53645 A | 2/1995 |
| JP | 8-208769 A | 8/1996 |
| JP | 8-208770 A | 8/1996 |

*Primary Examiner*—James J. Seidleck
*Assistant Examiner*—Olga Asinovsky
(74) *Attorney, Agent, or Firm*—Haugen Law Firm PLLP

(57) ABSTRACT

The present invention provides a novel amino-group-containing polymer (salt) and a production process therefor wherein the amino-group-containing polymer (salt) is a product by a process including the step of introducing amino groups into a grafted polymer having a polyether skeleton, and can make good use of the reactivity or cationic property of at least primary amino groups and further, according to circumstances, secondary amino groups, and further can display various performances, such as curability useful for various uses and adsorbency onto films or fibers. The novel amino-group-containing polymer (salt) is a product by a process including the steps of: carrying out a graft polymerization of a monoethylenically unsaturated monomer component onto a polyether compound, wherein the monoethylenically unsaturated monomer component includes an unsaturated carboxylic monomer as an essential component, and wherein the polyether compound has a specific repeating unit in a ratio of not less than 30 mol % and has a number-average molecular weight of not less than 150; and introducing amino groups by carrying out a ring-opening addition of an alkylenimine to at least a part of carboxyl group portions of the monoethylenically unsaturated monomer component which has been graft-polymerized onto the polyether compound, wherein at least a part of the amino groups might be neutralized with an acid.

6 Claims, No Drawings

AMINO-GROUP-CONTAINING POLYMER (SALT) AND PRODUCTION PROCESS THEREFOR

BACKGROUND OF THE INVENTION

A. Technical Field

The present invention relates to a novel amino-group-containing polymer (salt) and a production process therefor wherein the amino-group-containing polymer (salt) is a product by a process including the step of introducing amino groups into a grafted polymer having a polyether skeleton.

B. Background Art

Grafted polymers obtained by carrying out a graft polymerization of unsaturated carboxylic monomers such as (meth)acrylic acid onto polyether compounds are, for example, utilized for uses, such as detergent builders, scale inhibitors, lubricants, dyeing assistants, fiber-treating agents, and dispersants for organic or inorganic particles, by taking advantage of the hydrophilicity of the grafted polymers. Such hydrophilic grafted polymers are, for example, disclosed in JP-A-208769/1996, JP-A-208770/1996, and JP-A-053645/1995.

On the other hand, amino-group-containing polymers are known to display excellent performances due to the presence of the amino group, such as epoxy curability and reactivity to other functional groups. For example, a curable resin composition comprising an amino-group-containing acrylic resin is disclosed in U.S. Pat. No. 3,705,076 and JP-A-056549/1988 wherein the amino-group-containing acrylic resin is obtained by carrying out a ring-opening addition of an alkylenimine to carboxyl group portions of a carboxyl-group-containing acrylic polymer; and a water-soluble resin comprising an acid-neutralized salt of an amino-group-containing acrylic resin is disclosed in U.S. Pat. No. 3,719,629 wherein the amino-group-containing acrylic resin is obtained by carrying out a ring-opening addition of an alkylenimine to carboxyl group portions of a carboxyl-group-containing acrylic polymer; and an amino-group-containing acrylic polymer, obtained by carrying out a ring-opening addition of an alkylenimine to a part of carboxyl group portions of a carboxyl-group-containing acrylic polymer and then neutralizing the rest of the carboxyl group portions with basic compounds such as triethylamine, is disclosed in U.S. Pat. No. 4,126,596; and a curable resin composition obtained by Michael addition between a polyvalent amino compound, such as polyamine or polyamide, and a polyvalent acryloyl group is disclosed as an adhesive in JP-A-023615/1986; and a polymer with a side chain amino group, which is obtained by carrying out a reaction between a carboxyl group of a polymer and a polyamine, is disclosed as a paint in JP-B-061321/1988 wherein the raw polymer is obtained by carrying out a copolymerization of a carboxyl-group-containing unsaturated monomer with another copolymerizable unsaturated monomer and wherein the polyamine has an aliphatic amino group or both an aliphatic amino group and at least one ether group.

However, in consideration of the ionic aspect, it is a conventional idea that a polyether skeleton having the nonionic character is usually endowed with only either anionic or cationic character by introducing either an anionic or cationic group as a graft portion. It is difficult to lead to an idea of introducing an anionic carboxyl group and then converting it into a cationic group. Therefore, up to now, no polymers obtained by introducing the carboxyl group and further an amino group into a graft portion of a grafted polymer having a polyether skeleton have been studied, and there have been no reports as to such polymers, either.

SUMMARY OF THE INVENTION

A. Object of the Invention

An object of the present invention is to provide a novel amino-group-containing polymer (salt) and a production process therefor wherein the amino-group-containing polymer (salt) is a product by a process including the step of introducing amino groups into a grafted polymer having a polyether skeleton.

B. Disclosure of the Invention

That is to say, an amino-group-containing polymer (salt), according to the present invention, is a product by a process including the steps of:

carrying out a graft polymerization of a monoethylenically unsaturated monomer component onto a polyether compound, wherein the monoethylenically unsaturated monomer component includes an unsaturated carboxylic monomer as an essential component, and wherein the polyether compound has a repeating unit of a general formula below in a ratio of not less than 30 mol % and has a number-average molecular weight of not less than 150; and introducing amino groups by carrying out a ring-opening addition of an alkylenimine to at least a part of carboxyl group portions of the monoethylenically unsaturated monomer component which has been graft-polymerized onto the polyether compound, wherein at least a part of the amino groups might be neutralized with an acid;

wherein the general formula is:

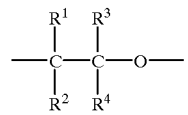

wherein: $R^1$, $R^2$, $R^3$ and $R^4$ denote at least one member selected from the group consisting of a hydrogen atom, alkyl groups, alkenyl groups, and aryl groups, and these groups may coexist in a molecule.

A production process for an amino-group-containing polymer (salt), according to the present invention, comprises the steps of:

carrying out a graft polymerization of a monoethylenically unsaturated monomer component onto a polyether compound, wherein the monoethylenically unsaturated monomer component includes an unsaturated carboxylic monomer as an essential component, and wherein the polyether compound has a repeating unit of a general formula below in a ratio of not less than 30 mol % and has a number-average molecular weight of not less than 150; and carrying out a ring-opening addition of an alkylenimine to at least a part of carboxyl group portions of the monoethylenically unsaturated monomer component;

wherein the general formula is:

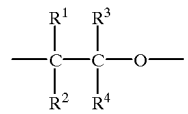

wherein: $R^1$, $R^2$, $R^3$ and $R^4$ denote at least one member selected from the group consisting of a hydrogen atom, alkyl groups, alkenyl groups, and aryl groups, and these groups may coexist in a molecule.

These and other objects and the advantages of the present invention will be more fully apparent from the following detailed disclosure.

DETAILED DESCRIPTION OF THE INVENTION

The amino-group-containing polymer (salt), according to the present invention, is a product by a process including the steps of: carrying out a graft polymerization of a monoethylenically unsaturated monomer component onto a polyether compound; and carrying out a ring-opening addition of an alkylenimine to at least a part of carboxyl group portions of the monoethylenically unsaturated monomer component. More specifically, the amino-group-containing polymer (salt) is a product by a process including the steps of:

carrying out a graft polymerization of a monoethylenically unsaturated monomer component onto a polyether compound, wherein the monoethylenically unsaturated monomer component includes an unsaturated carboxylic monomer as an essential component, and wherein the polyether compound has a repeating unit of a general formula below in a ratio of not less than 30 mol % and has a number-average molecular weight of not less than 150; and carrying out a ring-opening addition of an alkylenimine to at least a part of carboxyl group portions of the monoethylenically unsaturated monomer component which has been graft-polymerized onto the polyether compound;

wherein the general formula is:

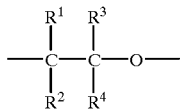

wherein: $R^1$, $R^2$, $R^3$ and $R^4$ denote at least one member selected from the group consisting of a hydrogen atom, alkyl groups, alkenyl groups, and aryl groups, and these groups may coexist in a molecule.

A more specific mode for the amino-group-containing polymer (salt), according to the present invention, is an amino-group-containing polymer (salt) which is a product by a process including the steps of: carrying out a graft polymerization of a monoethylenically unsaturated monomer component onto a polyether compound in order to obtain a grafted polymer, wherein the monoethylenically unsaturated monomer component includes an unsaturated carboxylic monomer as an essential component; and carrying out a ring-opening addition of an alkylenimine to at least a part of carboxyl group portions derived from the unsaturated carboxylic monomer of the monoethylenically unsaturated monomer component which forms a graft portion of the grafted polymer.

In addition, in the more specific mode for the present invention, the above-defined grafted polymer in the present invention may be a grafted polymer composition obtained by a process including the step of carrying out a graft polymerization of a monoethylenically unsaturated monomer component onto a polyether compound, wherein the monoethylenically unsaturated monomer component includes an unsaturated carboxylic monomer as an essential component. This grafted polymer composition comprises the above-mentioned grafted polymer as an essential component, and the content of the grafted polymer is not especially limited. In a preferred mode for the present invention, the amino-group-containing polymer (salt) according to the present invention can be obtained by a process including the step of carrying out a ring-opening addition of an alkylenimine to the grafted polymer composition.

In the present invention, the polyether compound is a compound having the repeating unit represented by the above general formula in a ratio of not less than 30 mol %, preferably not less than 50 mol %, of the entirety of the polyether compound. Such a polyether compound is, for example, obtained by a process including the step of polymerizing a cyclic ether by such as conventional methods in the presence of a reactant which serves as a polymerization initiation site, wherein the cyclic ether comprises at least one alkylene oxide selected from the group consisting of such as ethylene oxide, propylene oxide, 1-butene oxide, 2-butene oxide, styrene oxide, epichlorohydrin, glycidol, methyl glycidyl ether, ethyl glycidyl ether, iso-butyl glycidyl ether, methoxypolyethylene glycol monoglycidyl ether, phenoxypolyethylene glycol monoglycidyl ether, allyl glycidyl ether, phenyl glycidyl ether, and α-olefin oxide as an essential component and, if necessary, further comprises another alkylene oxide which is copolymerizable with those alkylene oxides. Particularly, it is preferable to use ethylene oxide and/or propylene oxide as the essential component of the cyclic ether in consideration of the grafting efficiency of the monoethylenically unsaturated monomer component. Furthermore, the ethylene oxide and/or propylene oxide is preferably used in a ratio of not less than 30 mol %, more preferably not less than 50 mol %, of the entirety of the polyether compound. In addition, examples of other alkylene oxides include tetrahydrofuran and oxetane.

The above reactant is a compound which serves as an initiation site of the polymerization of the cyclic ether, and is not especially limited in such as its kind and molecular weight. Examples of the reactant include: water; hydrogen; alcohols; phenols; hydrogen halides; ammonia; amines; hydroxylamine; carboxylic acids; acid halides; lactones; and aldehydes. These can be used either alone respectively or in combinations with each other. Of them, at least one member selected from the group consisting of water, alcohols, phenols, and amines is preferable as the reactant.

Examples of the above-mentioned alcohol include: primary aliphatic alcohols having 1 to 22 carbon atoms, such as methanol, ethanol, n-propanol, and n-butanol; aromatic alcohols, such as phenol, cresol, ethylphenol, cumylphenol, xylenol, octylphenol, tert-butylphenol, nonylphenol, and naphthol; secondary alcohols having 3 to 18 carbon atoms, such as iso-propyl alcohol and alcohols obtained by a process including the step of oxidizing n-paraffin; tertiary alcohols, such as tert-butanol; diols, such as ethylene glycol, diethylene glycol, propanediol, butanediol, and propylene glycol; triols, such as glycerin and trimethylolpropane; and polyols, such as sorbitol. These can be used either alone respectively or in combinations with each other.

Examples of the above-mentioned amine include: aromatic amines, such as aniline and naphthylamine; alkylamines having 3 to 22 carbon atoms, such as dodecylamine and stearylamine; and alkyldiamines, such as ethylenediamine. These can be used either alone respectively or in combinations with each other.

The reaction form of the polymerization of the cyclic ether is not especially limited, but, for example, may be any one of: (1) anionic polymerization by use of basic catalysts such as strong alkalis (e.g. hydroxides and alcoholates of alkaline metals) and alkylamines; (2) cationic polymerization by use of catalysts, such as metal halides, semi-metal halides, mineral acids, and acetic acid; and (3) coordination polymerization by use of combinations of such as metal (e.g. aluminum, iron, zinc) alkoxides, alkaline earth compounds, and Lewis acids.

The polyether compound may be a derivative from the polyether obtained by the above-mentioned polymerization. Examples of such a derivative include: terminal-group-converted compounds obtained by a process including the step of converting a terminal functional group of the polyether; and crosslinked products obtained by a process including the step of reacting the polyether with a crosslinking agent having a plurality of groups such as carboxyl group, isocyanate group, epoxy group, acid anhydride group, and halogen group. Preferable of the terminal-group-converted compounds are as follows: products by a process including the step of esterifying at least one terminal hydroxyl group of the above-mentioned polyether with fatty acids having 2 to 22 carbon atoms or anhydrides thereof (such as acetic acid and acetic anhydride) or with dicarboxylic acids (such as succinic acid, succinic anhydride, and adipic acid); and products by a process including the step of mono- or dietherifying at least one terminal hydroxyl group of the above-mentioned polyether by what is called Williamson (A. W. Williamson)'s synthesis of ether process (process comprising the step of etherifying an alcoholic hydroxyl group with an alkali and an alkyl halide).

In the present invention, the number-average molecular weight of the polyether compound is not less than 150. The upper limit of the number-average molecular weight is not especially limited, but is preferably not more than 100,000. In the case where the number-average molecular weight is less than 150, there are problems in that the grafting ratio is so low that a large amount of polyether compound remains unreacted. In the case where the number-average molecular weight exceeds 100,000, the viscosity tends to be high and it is therefore difficult to handle the polyether compound during the polymerization.

The number of the repeating units of the above general formula in the polyether compound is not especially limited, but is preferably not smaller than 2, more preferably not smaller than 3, in the polyether compound. As to $R^1$, $R^2$, $R^3$ and $R^4$ in the above general formula representing the repeating unit, at least one thereof is preferably a hydrogen atom.

In the present invention, the monoethylenically unsaturated monomer component includes the unsaturated carboxylic monomer as an essential component and, if necessary, may further include another unsaturated monomer which is copolymerizable with the unsaturated carboxylic monomer.

Examples of the unsaturated carboxylic monomer include ethylenically unsaturated carboxylic acids, such as (meth) acrylic acid, itaconic acid, maleic acid, fumaric acid, and maleic anhydride. These can be used either alone respectively or in combinations with each other. Of them, at least one member selected from the group consisting of (meth) acrylic acid, maleic acid, fumaric acid, and maleic anhydride is preferable in consideration of polymerizability.

There is no especial limitation in the above other unsaturated monomer copolymerizable with the unsaturated carboxylic monomer if it is a monomer other than the unsaturated carboxylic monomer. Examples thereof include: alkyl (meth)acrylates obtained by a process including the step of esterifying (meth)acrylic acid with alcohols having 1 to 18 carbon atoms, such as methyl (meth)acrylate, ethyl (meth) acrylate, butyl (meth)acrylate, and cyclohexyl (meth) acrylate; amide-group-containing monomers, such as (meth) acrylamide, dimethylacrylamide, and isopropylacrylamide; vinyl esters, such as vinyl acetate; alkenes, such as ethylene and propylene; aromatic vinyl monomers, such as styrene and styrenesulfonic acid; maleimide and derivatives therefrom such as phenylmaleimide and cyclohexylmaleimide; nitrile-group-containing vinyl monomers, such as (meth) acrylonitrile; aldehyde-group-containing vinyl monomers, such as (meth)acrolein; sulfonic-acid-group-containing monomers, such as 2-acrylamido-2-methylpropanesulfonic acid, allylsulfonic acid, vinylsulfonic acid, 2-hydroxy-3-allyloxy-1-propanesulfonic acid, and 2-hydroxy-3-butenesulfonic acid; alkyl vinyl ethers, such as methyl vinyl ether, ethyl vinyl ether, and butyl vinyl ether; and other-functional-group-containing monomers, such as vinyl chloride, vinylidene chloride, allyl alcohol, and vinylpyrrolidone. These can be used either alone respectively or in combinations with each other.

The ratio of the unsaturated carboxylic monomer in the monoethylenically unsaturated monomer component is not especially limited, but is preferably not less than 30 weight %, more preferably not less than 40 weight %, most preferably not less than 50 weight %, per 100 weight % of the monoethylenically unsaturated monomer component in consideration of reactivity in the below-mentioned ring-opening addition of the alkylenimine.

When the graft polymerization of the monoethylenically unsaturated monomer component onto the polyether compound is carried out, the monoethylenically unsaturated monomer component is preferably used in a ratio of 0.02 to 4 parts by weight, more preferably 0.1 to 2 parts by weight, per part by weight of the polyether compound. In the case where the ratio of the monoethylenically unsaturated monomer component is less than 0.02 parts by weight per part by weight of the polyether compound, it is difficult to exhibit properties derived from the amino group. On the other hand, in the case where the ratio of the monoethylenically unsaturated monomer component is more than 4 parts by weight per part by weight of the polyether compound, it tends to be difficult to structurally design the desired properties, such as balance between hydrophilicity and hydrophobicity of the polymer, on the basis of the polyether skeleton.

When carrying out the graft polymerization of the monoethylenically unsaturated monomer component onto the polyether compound, an organic peroxide is preferably used as a polymerization initiator. Examples of the organic peroxide include:

ketone peroxides, such as cyclohexanone peroxide, methyl ethyl ketone peroxide, methylcyclohexanone peroxide, methylacetoacetate peroxide, and 3,3,5-trimethylcyclohexanone peroxide;

peroxyketals, such as 1,1-bis(tert-hexylperoxy)-3,3,5-trimethylcyclohexane, 1,1-bis(tert-hexylperoxy) cyclohexane, 1,1-bis(tert-butylperoxy)-3,3,5-trimethylcyclohexane, 1,1-bis(tert-butylperoxy)-2-methylcyclohexane, 1,1-bis(tert-butylperoxy) cyclohexane, 2,2-bis(tert-butylperoxy)butane, n-butyl-4, 4-bis(tert-butylperoxy)valerate, and 2,2-bis(tert-butylperoxy)octane;

hydroperoxides, such as p-menthane hydroperoxide, diisopropylbenzene hydroperoxide, 1,1,3,3-tetramethylbutyl hydroperoxide, cumene hydroperoxide, tert-hexyl hydroperoxide, tert-butyl hydroperoxide, 2,5-dimethylhexane-2,5-dihydroperoxide and 2-(4-methylcyclohexyl)propane hydroperoxide;

dialkyl peroxides, such as α,α'-bis(tert-butylperoxy)-p-diisopropylbenzene, dicumyl peroxide, 2,5-dimethyl-2,5- bis(tert-butylperoxy)hexane, tert-butylcumyl peroxide, di-tert-butyl peroxide, 2,5-dimethyl-2,5-bis(tert-butylperoxy)hexyne-3, and α,α'-bis(tert-butylperoxy)-p-isopropylhexyne;

diacyl peroxides, such as isobutyryl peroxide, 3,3,5-trimethylcyclohexanoyl peroxide, octanoyl peroxide, lauroyl peroxide, stearoyl peroxide, succinic acid peroxide, m-toluoyl peroxide, benzoyl peroxide, acetyl peroxide, decanoyl peroxide, and 2,4-dichlorobenzoyl peroxide;

peroxydicarbonates, such as di-n-propyl peroxydicarbonate, di-isopropyl peroxydicarbonate, bis-(4-tert-butylcyclohexyl) peroxydicarbonate, di-2-ethoxyethyl peroxydicarbonate, di-2-ethylhexyl peroxydicarbonate, di-3-methoxybutyl peroxydicarbonate, di-sec-butyl peroxydicarbonate, di(3-methyl-3-methoxybutyl) peroxydicarbonate, dimyristyl peroxydicarbonate, di-methoxyisopropyl peroxydicarbonate, and di-allyl peroxydicarbonate;

peroxyesters, such as α,α'-bis(neodecanoperoxy)diisopropylbenzene, cumyl peroxyneodecanoate, 1,1,3,3-tetramethylbutyl peroxyneodecanoate, 1-cyclohexyl-1-methylethyl peroxyneodecanoate, tert-hexyl peroxyneodecanoate, tert-butyl peroxyneodecanoate, tert-hexyl peroxypivalate, tert-butyl peroxypivalate, 1,1,3,3-tetramethylbutyl peroxy-2-ethylhexanoate, 2,5-dibutyl-2,5-bis(2-ethylhexanoylperoxy)hexane, 1-cyclohexyl-1-methylethyl peroxy-2-ethylhexanoate, tert-hexyl peroxy-2-ethylhexanoate, tert-butyl peroxy-2-ethylhexanoate, tert-butyl peroxyisobutyrate, tert-hexyl peroxyisopropylmonocarbonate, tert-butyl peroxymaleic acid, tert-butyl peroxy-3,5,5-trimethylcyclohexanoate, tert-butyl peroxylaurate, 2,5-dibutyl-2,5-bis(m-tolylperoxy)hexane, tert-butyl peroxyisopropylmonocarbonate, tert-butyl peroxy-2-ethylhexylmonocarbonate, tert-hexyl peroxybenzoate, 2,5-dimethyl-2,5-bis(benzoylperoxy)hexane, tert-butyl peroxyacetate, tert-butyl peroxy-m-tolylbenzoate, tert-butyl peroxybenzoate, bis(tert-butylperoxy)isophthalate, cumyl peroxyoctanoate, tert-hexyl peroxyneohexanoate, and cumyl peroxyneohexanoate; and other organic peroxides, such as tert-butyl peroxyallylcarbonate, tert-butyl trimethylsilyl peroxide, and acetylcyclohexylsulfonyl peroxide. These can be used either alone respectively or in combinations with each other.

The amount of the organic peroxide as used is not especially limited, but is preferably in the range of 0.1 to 30 weight %, more preferably 0.5 to 20 weight %, of the monoethylenically unsaturated monomer component. In the case where the amount is smaller than 0.1 weight %, the ratio of grafting onto the polyether compound tends to be low. On the other hand, in the case where the amount exceeds 30 weight %, there are economical disadvantages because the organic peroxide is expensive. It is preferable that the organic peroxide is added simultaneously with addition of the ethylenically unsaturated monomer component and separately from the polyether compound without being premixed with the polyether compound. However, the organic peroxide may beforehand be added to either the polyether compound or monoethylenically unsaturated monomer component.

When the graft polymerization of the monoethylenically unsaturated monomer component onto the polyether compound is carried out, either a catalyst for decomposing the organic peroxide or a reducible compound may be used together with the organic peroxide.

Examples of the catalyst for decomposing the organic peroxide include: metal halides such as lithium chloride and lithium bromide; metal oxides such as titanium oxide and silicon dioxide; metal salts of inorganic acids such as hydrochloric acid, hydrobromic acid, perchloric acid, sulfuric acid, and nitric acid; carboxylic acids, such as formic acid, acetic acid, propionic acid, butyric acid, isobutyric acid, and benzoic acid, and their esters and metal salts; and heterocyclic amines, such as pyridine, indole, imidazole, and carbazole, and derivatives therefrom. These can be used either alone respectively or in combinations with each other.

Examples of the reducible compound include: organometallic compounds such as ferrocene; inorganic compounds which can generate metal ions (e.g. iron, copper, nickel, cobalt, manganese), such as iron naphthenate, copper naphthenate, nickel naphthenate, cobalt naphthenate, and manganese naphthenate; inorganic compounds, such as trifluoroborate-ether adduct, potassium permanganate, and perchloric acid; sulfur-containing compounds such as sulfur dioxide, sulfite salts, sulfate esters, bisulfite salts, thiosulfate salts, sulfoxylate salts, and aromatic sulfonic acid homologues (e.g. benzenesulfonic acid, its substituted products, and p-toluenesulfonic acid); mercapto compounds, such as octylmercaptan, dodecylmercaptan, mercaptoethanol, α-mercaptopropionic acid, thioglycolic acid, thiopropionic acid, sodium α-thiopropionate sulfopropyl ester, and sodium α-thiopropionate sulfoethyl ester; nitrogen-containing compounds, such as hydrazine, β-hydroxyethylhydrazine and hydroxylamine; aldehydes, such as formaldehyde, acetaldehyde, propionaldehyde, n-butyraldehyde, isobutyraldehyde, and isovaleraldehyde; and ascorbic acid. These can be used either alone respectively or in combinations with each other.

The graft polymerization is preferably carried out substantially in the absence of solvent, but a solvent may be used in an amount of not larger than 20 weight % of the entirety of the reaction system. In the case where the amount of the solvent exceeds 20 weight % of the entirety of the reaction system, the grafting ratio of the monoethylenically unsaturated monomer component tends to be low. In the case where the reaction system has high viscosity, the use of a small amount of solvent might be preferable for handling, and the solvent may be distilled off after being added.

The above solvent is not especially limited, but it is preferable to use, for example, a solvent such that the constant of chain transfer thereto of the monomer as used is as small as possible, or a solvent which has a boiling point of not lower than 80° C. so as to be usable for a reaction under normal pressure. Examples of such a solvent include: water; alcohols, such as iso-butyl alcohol, n-butyl alcohol, tert-butyl alcohol, ethylene glycol, diethylene glycol, triethylene glycol, propylene glycol, ethylene glycol monoalkyl ether, and propylene glycol monoalkyl ether; diethers, such as ethylene glycol dialkyl ether and propylene glycol dialkyl ether; and acetic compounds, such as acetic acid, ethyl acetate, propyl acetate, butyl acetate, ethylene glycol monoalkyl ether acetate, and propylene glycol monoalkyl ether acetate. These can be used either alone respectively or in combinations with each other. Examples of alkyl groups in the above-mentioned alcohols and diethers include methyl group, ethyl group, propyl group, and butyl group.

The temperature of the graft polymerization is not especially limited, but is preferably not lower than 80° C., more preferably in the range of 90 to 160° C. In the case where the temperature is lower than 80° C., the graft polymerization is so difficult to proceed that the grafting ratio of the monoethylenically unsaturated monomer component tends to be low. On the other hand, in the case where the temperature exceeds 160° C., thermolysis of the polyether compound and the resultant grafted polymer might occur.

When carrying out the graft polymerization, it is preferable to charge a portion or the entirety of the polyether compound in the initial stage. For example, in the case where at least one monomer (A) selected from the group consisting of maleic acid, fumaric and, and maleic anhydride is graft-polymerized together with (meth)acrylic acid as the monoethylenically unsaturated monomer components onto the polyether compound, it is preferable that: not less than half the monomer (A) is premixed with the polyether compound, and the resultant mixture is heated to not lower than 80° C., and then the residual monoethylenically unsaturated monomer components and the organic peroxide are separately added to the heated mixture to carry out the graft polymerization. Such a process enables to easily control the molecular weight of the resultant grafted polymer.

The amino-group-containing polymer (salt), according to the present invention, is a product by a process including the step of carrying out a ring-opening addition of an alkylenimine to carboxyl group portions of the graft-polymerized monoethylenically unsaturated monomer component. As to this amino-group-containing polymer (salt) according to the present invention, it is enough that the ring-opening addition of the alkylenimine to the carboxyl group portions of the graft-polymerized monoethylenically unsaturated monomer component is made to at least a part of the carboxyl group portions of the graft-polymerized monoethylenically unsaturated monomer component, and, as is mentioned below, the amino-group-containing polymer (salt) may be that in which a part of the carboxyl group portions of the graft-polymerized monoethylenically unsaturated monomer component are neutralized with a basic compound, and in which the alkylenimine is ring-opening-added to at least a part of the residual unneutralized carboxyl group portions. In this case, a part or all of the residual carboxyl group portions in the amino-group-containing polymer (salt) are in the form neutralized with the above basic compound. In this way, the carboxyl group of the monoethylenically unsaturated monomer component can be converted into an amino group by carrying out the ring-opening addition of the alkylenimine.

Examples of the alkylenimine include ethylenimine, propylenimine, butylenimine, and N-(2-hydroxyethyl) aziridine. In addition, N-(aminoalkyl)-substituted alkylenimines, such as N-(2-aminoethyl)aziridine, N-(3-aminopropyl)aziridine, and N-(2-aminopropyl) propylenimine, can also be used likewise. Furthermore, alkylenimine compounds obtained by Michael addition of alkylenimines to acryloyl-group-containing compounds, such as methyl 3-aziridinopropionate obtained by addition of ethylenimine to the acryloyl group of methyl acrylate and N-(2-cyanoethyl)aziridine obtained by addition of ethylenimine to the double bond of acrylonitrile, can also be used likewise. In the present invention, when a compound having 2 to 8 carbon atoms is used particularly of the alkylenimines, there are advantages also in respect to production cost because plenty of amino groups can be introduced by use of a small amount of alkylenimine and because the ring-opening addition can be carried out in a short time due to high reactivity.

The method for carrying out the ring-opening addition of the alkylenimine is not especially limited, but, for example, the ring-opening addition can easily be carried out by mixing the carboxyl-group-containing grafted polymer or the monoethylenically unsaturated monomer component with the alkylenimine by stirring them under temperature conditions of 10 to 150° C., preferably 40 to 100° C. Incidentally, this ring-opening addition reaction may be carried out in the absence of solvent, or can be carried out by use of the aforementioned solvent usable in the graft polymerization reaction.

When carrying out the ring-opening addition of the alkylenimine, the amount of the alkylenimine as used is preferably in the range of 0.1 to 10 mols per mol of the carboxyl group of the monoethylenically unsaturated monomer component. In the case where the amount of the alkylenimine is smaller than 0.1 mol, it is difficult to exhibit properties derived from the amino group. On the other hand, in the case where the amount of the alkylenimine exceeds 10 mols, storage stability of the resultant amino-group-containing polymer (salt) tends to be inferior.

The conversion of the carboxyl group of the monoethylenically unsaturated monomer component into the amino group by carrying out the ring-opening addition of the alkylenimine may fitly be selected so as to display properties according to use purposes. However, it is preferable that not less than 10 mol % of the carboxyl group of the monoethylenically unsaturated monomer component is converted into the amino group. In the case where this conversion is less than 10 mol %, it is difficult to display properties derived from the amino group.

The amino-group-containing polymer (salt), according to the present invention, preferably has an amine value of 0.1 to 12 mmols/g in terms of solid content by colloidal titration with poly(potassium vinyl sulfate). In the case where the amine value exceeds this range, the storage stability tends to be inferior. On the other hand, in the case where the amine value is lower than the above range, it is difficult to display properties derived from the amino group.

When a part of the carboxyl group portions of the monoethylenically unsaturated monomer component which has been graft-polymerized onto the polyether compound remains or is intentionally made to remain in the amino-group-containing polymer (salt) according to the present invention, the amino-group-containing polymer (salt) may be in the form of a salt in which at least a part of the remaining carboxyl group portions are neutralized with a basic compound. Examples of the basic compound, which is used to neutralize the carboxyl group portions, include: inorganic basic compounds, such as sodium hydroxide and potassium hydroxide; ammonia; and organic basic compounds, such as methylamine, dimethylamine, trimethylamine, ethylamine, diethylamine, triethylamine, monoethanolamine, diethanolamine, triethanolamine, dimethylaminoethanol, and aniline. These can be used either alone respectively or in combinations with each other.

The amino-group-containing polymer (salt), according to the present invention, may be in the form of a salt in which at least a part of the amino groups are neutralized with an acid. Such an amino-group-containing polymer salt is obtained by a process including the step of neutralizing the resultant amino-group-containing polymer with an acid compound.

Examples of the above acid compound include: inorganic acids, such as hydrochloric acid, hydrobromic acid, phosphoric acid, and sulfuric acid; organic acids, such as formic acid, acetic acid, propionic acid, citric acid, lactic acid, (meth)acrylic acid, oxalic acid, succinic acid, maleic acid, poly((meth)acrylic acid) or its partial salts. These can be used either alone respectively or in combinations with each other. The amount of the acid compound as used may fitly be set according to uses and is not especially limited, but is preferably not larger than 5 mols per mol of the amino groups of the amino-group-containing polymer. In the case where the amount exceeds 5 mols per mol of the amino groups of the amino-group-containing polymer, there are disadvantages in that the pH might be so low as to deteriorate the stability.

The process for the neutralization with the acid compound is not especially limited, but, for example, the amino-group-containing polymer and the acid compound may be mixed together by stirring them in the range of 0 to 120° C., preferably 10 to 80° C. Incidentally, the neutralization may be carried out either in the absence of solvent or in the presence of a solvent which is, for example, usable in the aforementioned graft polymerization reaction.

As to the amino-group-containing polymer (salt) according to the present invention, it is easy to structurally design its desired properties, ranging from hydrophilicity to hydrophobicity or from softness to rigidity, due to possession of the polyether skeleton, and further it is possible to display various performances, such as curability useful for various uses and adsorbency onto films or fibers, due to possession of the amino group. In addition, the amino groups of the amino-group-containing polymer (salt) according to the present invention can include at least primary amino groups and further, according to circumstances, secondary amino groups, so it is possible to easily add thereto further such as epoxy compounds, isocyanate compounds, acid anhydrides, acyl halide compounds, and acryloyl compounds, and the resultant product can also be a raw material for various derivatives. Therefore, the amino-group-containing polymer (salt), according to the present invention, can favorably be utilized for the wide range of uses such as epoxy curing agents, solid electrolytes for cells, enzyme fixers, water-retaining agents, sludge flocculants, flocculants, heavy metal collectors, soot collectors, chelating agents, ion-exchange resins, excavated-soil-treating agents, viscosity-adjusting agents, drilling mud additives for construction work and oil well drilling, pressure sensitive adhesives, sealants, paints, adhesives, anchor coating agents, primers, surface-treating agents, inks (e.g. gravure inks, offset inks), ink jet inks, ceramic binders, anticorrosives, adsorbents, odor eaters, paper strength reinforcements, yield modifiers, water filterability modifiers, binders for pigment coating, dispersants for papermaking, deinking agents, hairdressings, cosmetic base agents, cosmetic additives, detergent additives, builders for powdery and liquid detergents, surfactants, emulsifiers, bubble conditioners, deemulsifiers, scale inhibitors, inorganic substance dispersants, pigment dispersants, cement dispersants (e.g. AE agents, water-reducing agents for cement), flotating agents, oil additives (e.g. viscosity index enhancing agents, cleaning agents), fiber-treating agents, dyeing modifiers, antistatic agents, fiber softeners, and crosslinking agents.

(Effects and Advantages of the Invention):

The amino-group-containing polymer (salt), according to the present invention, can make good use of the reactivity or cationic property of the primary amino group and further can display various performances, such as curability useful for various uses and adsorbency onto films or fibers. Specifically, antistatic effects, or effects such as the improvement of slippability and the endowment of hydrophilicity and surface activity, upon films or fibers are obtained. Particularly, this polymer (salt) is applicable also to conversion of such as polyester fibers into hydrophilic ones. Therefore, the amino-group-containing polymer (salt), according to the present invention, can favorably be utilized for the wide range of uses such as epoxy curing agents, solid electrolytes for cells, enzyme fixers, water-retaining agents, sludge flocculants, flocculants, heavy metal collectors, soot collectors, chelating agents, ion-exchange resins, excavated-soil-treating agents, viscosity-adjusting agents, drilling mud additives for construction work and oil well drilling, pressure sensitive adhesives, sealants, paints, adhesives, anchor coating agents, primers, surface-treating agents, inks (e.g. gravure inks, offset inks), ink jet inks, ceramic binders, anticorrosives, adsorbents, odor eaters, paper strength reinforcements, yield modifiers, water filterability modifiers, binders for pigment coating, dispersants for papermaking, deinking agents, hairdressings, cosmetic base agents, cosmetic additives, detergent additives, builders for powdery and liquid detergents, surfactants, emulsifiers, bubble conditioners, deemulsifiers, scale inhibitors, inorganic substance dispersants, pigment dispersants, cement dispersants (e.g. AE agents, water-reducing agents for cement), flotating agents, oil additives (e.g. viscosity index enhancing agents, cleaning agents), fiber-treating agents, dyeing modifiers, antistatic agents, fiber softeners, and crosslinking agents.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited thereto.

Incidentally, the acid value of the carboxyl-group-containing polymer in terms of solid content was measured by neutralization titration with an alkaline reagent; and the residual acid value of the amino-group-containing polymer in terms of solid content was measured by inverse colloidal titration involving addition of a certain amount of chitosan solution and use of poly(potassium vinyl sulfate); and the amine value of the amino-group-containing polymer in terms of solid content was measured by colloidal titration with poly(potassium vinyl sulfate).

EXAMPLE 1

A glass reactor, as equipped with a thermometer, a stirrer, a nitrogen-introducing tube, and a reflux condenser, was charged with 85 parts by weight of phenoxypolyethylene glycol having a number-average molecular weight of 530 (as obtained by an addition reaction of 10 mols on average of ethylene oxide to phenol), and then the charged material was heated to 128° C. while being stirred under a nitrogen gas stream. Next, 15 parts by weight of acrylic acid and 1.5 parts by weight of Perbutyl-Z (tert-butyl peroxybenzoate content: 98 weight %, made by NOF CORPORATION) were dropwise added separately and continuously over a period of 1 hour while maintaining the temperature in the range of 125 to 131° C. Thereafter, stirring was continued for 1 hour, thus obtaining a carboxyl-group-containing polymer as a grafted polymer. The acid value of this carboxyl-group-containing polymer was 1.91 mmols/g in terms of solid content.

Next, 125 parts by weight of propylene glycol monomethyl ether and 25 parts by weight of deionized water were added to 50 parts by weight of the resultant carboxyl-group-containing polymer under stirred conditions in order to obtain a uniform solution. Thereafter, 4.4 parts by weight of ethylenimine (carboxyl group/imino group=1.0 in molar ratio) was added to the solution over a period of 10 minutes at room temperature. After being stirred for 1 hour in the range of 25 to 30° C., the resultant reaction mixture was heated to 85° C., and then stirring was continued for 5 hours while maintaining the temperature in the range of 82 to 88° C. Thereafter, the resultant reaction mixture was cooled, thus obtaining an amino-group-containing polymer.

The residual acid value of the resultant amino-group-containing polymer was 0.23 mmols/g in terms of solid content. From this result, it was inferred that about 87% of the carboxyl groups had been converted by the ethylenimine. In addition, the amine value was 1.50 mmols/g in terms of solid content by colloidal titration. Incidentally, the resultant amino-group-containing polymer was analyzed by gas chromatography of which the detection limit was 1 ppm. As a result, no unreacted ethylenimine was detected.

EXAMPLE 2

A glass reactor, as equipped with a thermometer, a stirrer, a nitrogen-introducing tube, and a reflux condenser, was charged with 70 parts by weight of phenoxypolyethylene glycol having a number-average molecular weight of 970 (as obtained by an addition reaction of 20 mols on average of ethylene oxide to phenol) and 12 parts by weight of maleic acid, and then the charged materials were heated to 145° C. while being stirred under a nitrogen gas stream. Next, 18 parts by weight of acrylic acid and 1.5 parts by weight of Perbutyl-D (di-tert-butyl peroxide, made by NOF CORPORATION) were dropwise added separately and continuously over a period of 2 hours while maintaining the temperature in the range of 140 to 145° C. Thereafter, stirring was continued for 1 hour, thus obtaining a carboxyl-group-containing polymer as a grafted polymer. The acid value of this carboxyl-group-containing polymer was 3.40 mmols/g in terms of solid content.

Next, 90 parts by weight of propylene glycol monomethyl ether and 45 parts by weight of deionized water were added to 45 parts by weight of the resultant carboxyl-group-containing polymer under stirred conditions in order to obtain a uniform solution. Thereafter, 4.7 parts by weight of ethylenimine (carboxyl group/imino group=0.7 in molar ratio) was added to the solution over a period of 10 minutes at room temperature. After being stirred for 1 hour in the range of 25 to 30° C., the resultant reaction mixture was heated to 85° C., and then stirring was continued for 4 hours while maintaining the temperature in the range of 82 to 86° C. Thereafter, the resultant reaction mixture was cooled, thus obtaining an amino-group-containing polymer.

The residual acid value of the resultant amino-group-containing polymer was 1.2 mmols/g in terms of solid content. From this result, it was inferred that about 61% of the carboxyl groups had been converted by the ethylenimine. In addition, the amine value was 1.61 mmols/g in terms of solid content by colloidal titration. Incidentally, the resultant amino-group-containing polymer was analyzed by gas chromatography of which the detection limit was 1 ppm. As a result, no unreacted ethylenimine was detected.

EXAMPLE 3

A glass reactor, as equipped with a thermometer, a stirrer, a nitrogen-introducing tube, and a reflux condenser, was charged with 80 parts by weight of methoxypolyethylene glycol having a number-average molecular weight of 2,000 (reagent made by Aldrich), and then the charged material was heated to 145° C. while being stirred under a nitrogen gas stream. Next, 20 parts by weight of acrylic acid and 2.0 parts by weight of Perbutyl-D (di-tert-butyl peroxide, made by NOF CORPORATION) were dropwise added separately and continuously over a period of 2 hours while maintaining the temperature in the range of 140 to 145° C. Thereafter, stirring was continued for 1 hour, thus obtaining a carboxyl-group-containing polymer as a grafted polymer. The acid value of this carboxyl-group-containing polymer was 2.65 mmols/g in terms of solid content.

Next, 200 parts by weight of propylene glycol monomethyl ether and 100 parts by weight of deionized water were added to 100 parts by weight of the resultant carboxyl-group-containing polymer under stirred conditions in order to obtain a uniform solution. Thereafter, 17.9 parts by weight of ethylenimine (carboxyl group/imino group=1.5 in molar ratio) was added to the solution over a period of 20 minutes at room temperature. After being stirred for 1 hour in the range of 25 to 30° C., the resultant reaction mixture was heated to 85° C., and then stirring was continued for 5 hours while maintaining the temperature in the range of 82 to 84° C. Thereafter, the resultant reaction mixture was cooled, thus obtaining an amino-group-containing polymer.

The residual acid value of the resultant amino-group-containing polymer was 0.18 mmols/g in terms of solid content. From this result, it was inferred that about 92% of the carboxyl groups had been converted by the ethylenimine. In addition, the amine value was 2.92 mmols/g in terms of solid content by colloidal titration. Incidentally, the resultant amino-group-containing polymer was analyzed by gas chromatography of which the detection limit was 1 ppm. As a result, no unreacted ethylenimine was detected.

EXAMPLE 4

A glass reactor, as equipped with a thermometer, a stirrer, a nitrogen-introducing tube, and a reflux condenser, was charged with 80 parts by weight of methoxypolyethylene glycol having a number-average molecular weight of 500, and then the charged material was heated to 145° C. while being stirred under a nitrogen gas stream. Next, 24 parts by weight of acrylic acid, 6 parts by weight of maleic acid, and 2.0 parts by weight of Perbutyl-D (di-tert-butyl peroxide, made by NOF CORPORATION) were dropwise added separately and continuously over a period of 2 hours while maintaining the temperature in the range of 140 to 145° C. Thereafter, stirring was continued for 1 hour, thus obtaining a carboxyl-group-containing polymer as a grafted polymer. The acid value of this carboxyl-group-containing polymer was 3.80 mmols/g in terms of solid content.

Next, 50 parts by weight of propylene glycol monomethyl ether was added to 50 parts by weight of the resultant carboxyl-group-containing polymer under stirred conditions in order to obtain a uniform solution. Thereafter, 8.0 parts by weight of ethylenimine (carboxyl group/imino group=1.0 in molar ratio) was added to the solution over a period of 30 minutes at room temperature. After the addition had been completed, the resultant reaction mixture was heated to 50° C., and then stirring was continued for 8 hours while maintaining the temperature in the range of 48 to 52° C. Thereafter, the resultant reaction mixture was cooled, thus obtaining an amino-group-containing polymer.

The residual acid value of the resultant amino-group-containing polymer was 0.66 mmols/g in terms of solid content. From this result, it was inferred that about 80% of the carboxyl groups had been converted by the ethylenimine. In addition, the amine value was 3.20 mmols/g in terms of solid content by colloidal titration. Incidentally, the resultant amino-group-containing polymer was analyzed by gas chromatography of which the detection limit was 1 ppm. As a result, no unreacted ethylenimine was detected.

EXAMPLE 5

First, 50 parts by weight of deionized water was added to 50 parts by weight of a carboxyl-group-containing polymer (as obtained in the same way as of Example 4; acid value= 3.80 mmols/g in terms of solid content) under stirred conditions in order to obtain a uniform solution. Thereafter, 8.0 parts by weight of ethylenimine (carboxyl group/imino group=1.0 in molar ratio) was added to the solution over a period of 30 minutes at room temperature. After the addition had been completed, the resultant reaction mixture was heated to 50° C., and then stirring was continued for 8 hours while maintaining the temperature in the range of 48 to 52° C. Thereafter, the resultant reaction mixture was cooled, thus obtaining an amino-group-containing polymer.

The residual acid value of the resultant amino-group-containing polymer was 0.87 mmols/g in terms of solid content. From this result, it was inferred that about 73% of the carboxyl groups had been converted by the ethylenimine. In addition, the amine value was 2.90 mmols/g in terms of solid content by colloidal titration. Incidentally, the resultant amino-group-containing polymer was analyzed by gas chromatography of which the detection limit was 1 ppm. As a result, no unreacted ethylenimine was detected.

EXAMPLE 6

An autoclave, as equipped with a thermometer, a stirrer, and a nitrogen-introducing tube, was charged with 74 parts by weight of dipropylene glycol monomethyl ether and 1 part by weight of sodium hydroxide powder, and the internal air of the autoclave was displaced with nitrogen, and then the charged materials were heated to 130° C. Next, 426 parts by weight of ethylene oxide was introduced into the autoclave over a period of 3 hours, and then the resultant reaction mixture was aged at 130° C. for 2 hours and then cooled, thus obtaining a dipropylene glycol monomethyl ether-ethylene oxide adduct (number-average molecular weight=1,000, average molar number of addition=1.94).

Next, a glass reactor, as equipped with a thermometer, a stirrer, a nitrogen-introducing tube, and a reflux condenser, was charged with 85 parts by weight of the above-obtained dipropylene glycol monomethyl ether-ethylene oxide adduct, and then the charged material was heated to 145° C. while being stirred under a nitrogen gas stream. Next, 15 parts by weight of acrylic acid and 2.0 parts by weight of Perbutyl-D (di-tert-butyl peroxide, made by NOF CORPORATION) were dropwise added separately and continuously over a period of 2 hours while maintaining the temperature in the range of 140 to 145° C. Thereafter, stirring was continued for 1 hour, thus obtaining a carboxyl-group-containing polymer as a grafted polymer. The acid value of this carboxyl-group-containing polymer was 2.71 mmols/g in terms of solid content.

Next, 100 parts by weight of propylene glycol monomethyl ether and 50 parts by weight of deionized water were added to 50 parts by weight of the resultant carboxyl-group-containing polymer under stirred conditions in order to obtain a uniform solution. Thereafter, 6.0 parts by weight of ethylenimine (carboxyl group/imino group=1.0 in molar ratio) was added to the solution over a period of 10 minutes at room temperature. After being stirred for 1 hour in the range of 25 to 30° C., the resultant reaction mixture was heated to 85° C., and then stirring was continued for 5 hours while maintaining the temperature in the range of 82 to 88° C. Thereafter, the resultant reaction mixture was cooled, thus obtaining an amino-group-containing polymer.

The residual acid value of the resultant amino-group-containing polymer was 0.37 mmols/g in terms of solid content. From this result, it was inferred that about 85% of the carboxyl groups had been converted by the ethylenimine. In addition, the amine value was 2.35 mmols/g in terms of solid content by colloidal titration. Incidentally, the resultant amino-group-containing polymer was analyzed by gas chromatography of which the detection limit was 1 ppm. As a result, no unreacted ethylenimine was detected.

EXAMPLE 7

While the temperature was controlled in the range of 30 to 40° C., an aqueous hydrochloric acid solution was added to the amino-group-containing polymer as obtained in Example 5 (amine value=2.90 mmols/g in terms of solid content), wherein the amount of the aqueous hydrochloric acid solution corresponded to 0.8 times by mol of that of the amino groups of the amino-group-containing polymer. As a result, a hydrochloric-acid-neutralized salt of the amino-group-containing polymer was obtained.

EXAMPLE 8

While the temperature was controlled in the range of 30 to 40° C., acetic acid was added to the amino-group-containing polymer as obtained in Example 5 (amine value=2.90 mmols/g in terms of solid content), wherein the amount of the acetic acid corresponded to 2 times by mol of that of the amino groups of the amino-group-containing polymer. As a result, an acetic-acid-neutralized salt of the amino-group-containing polymer was obtained.

EXAMPLE 9

While the temperature was controlled in the range of 30 to 32° C., triethylamine was added to the amino-group-containing polymer as obtained in Example 5 (residual acid value=0.87 mmols/g in terms of solid content, amine value=2.90 mmols/g in terms of solid content), wherein the amount of the triethylamine corresponded to 0.5 times by mol of the residual acid value of the amino-group-containing polymer. As a result, a salt of the amino-group-containing polymer in which a part of the residual carboxyl groups were neutralized with the triethylamine was obtained.

EXAMPLE 10

A mixture was prepared by well mixing 10 parts by weight of the amino-group-containing polymer as obtained in Example 4 (solid content=50%, amine value=3.20 mmols/g in terms of solid content) and 3.1 parts by weight of bisphenol A type liquid epoxy resin (Epikote 828, produced by Yuka Shell Epoxy Kabushiki Kaisha) together, and the resultant mixture was coated onto a steel sheet with an applicator and then dried by heating in a hot-air drying oven of 150° C. for 10 minutes to form a coating film. The resultant coating film had the following properties:

dry coating film: 70 μm external appearance: transparent pencil scratching test (JIS-K5400): HB water resistance (rubbing test with deionized water): good.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An amino-group-containing polymer (salt), which is a product by a process including the steps of:

carrying out a graft polymerization of a monoethylenically unsaturated monomer component onto a polyether compound, wherein the monoethylenically unsaturated monomer component includes an unsaturated carboxylic monomer as an essential component, and wherein the polyether compound has a repeating unit of a general formula below in a ratio of not less than 30 mol % and has a number-average molecular weight of not less than 150; and introducing amino groups by carrying out a ring-opening addition of an alkylenimine to at least a part of carboxyl group portions of the monoethylenically unsaturated monomer component which has been graft-polymerized onto the polyether compound, wherein at least a part of the amino groups might be neutralized with an acid;

wherein the general formula is:

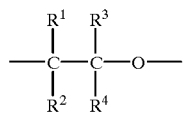

wherein: $R^1$, $R^2$, $R^3$ and $R^4$ denote at least one member selected from the group consisting of a hydrogen atom, alkyl groups, alkenyl groups, and aryl groups, and these groups may coexist in a molecule.

2. An amino-group-containing polymer (salt) according to claim 1, wherein the alkylenimine is a compound having 2 to 8 carbon atoms.

3. An amino-group-containing polymer (salt) according to claim 1, wherein a part of the carboxyl group portions of the monoethylenically unsaturated monomer component which has been graft-polymerized onto the polyether compound remains in the amino-group-containing polymer (salt), wherein at least a part of the remaining carboxyl group portions are neutralized with a basic compound.

4. An amino-group-containing polymer (salt) according to claim 2, wherein a part of the carboxyl group portions of the monoethylenically unsaturated monomer component which has been graft-polymerized onto the polyether compound remains in the amino-group-containing polymer (salt), wherein at least a part of the remaining carboxyl group portions are neutralized with a basic compound.

5. A production process for an amino-group-containing polymer (salt), which comprises the steps of:

carrying out a graft polymerization of a monoethylenically unsaturated monomer component onto a polyether compound, wherein the monoethylenically unsaturated monomer component includes an unsaturated carboxylic monomer as an essential component, and wherein the polyether compound has a repeating unit of a general formula below in a ratio of not less than 30 mol % and has a number-average molecular weight of not less than 150; and carrying out a ring-opening addition of an alkylenimine to at least a part of carboxyl group portions of the monoethylenically unsaturated monomer component;

wherein the general formula is:

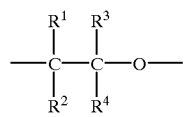

wherein:

$R^1$, $R^2$, $R^3$ and $R^4$ denote at least one member selected from the group consisting of a hydrogen atom, alkyl groups, alkenyl groups, and aryl groups, and these groups may coexist in a molecule.

6. A production process for an amino-group-containing polymer (salt) according to claim 5, wherein the alkylenimine as used is a compound having 2 to 8 carbon atoms.

* * * * *